US009637256B2

(12) United States Patent
Van Wickeren et al.

(10) Patent No.: US 9,637,256 B2
(45) Date of Patent: May 2, 2017

(54) APPARATUS FOR FORMING PACKAGING UNITS

(71) Applicant: KHS GmbH, Dortmund (DE)

(72) Inventors: Ernst Van Wickeren, Weeze (DE); Thomas Nitsch, Kleve (DE); Stefan Wagner, Xanten (DE); Volker Zahn, Volkmarsen (DE)

(73) Assignee: KHS GmbH, Dortmund (DE)

( * ) Notice: Subject to any disclaimer, the term of this patent is extended or adjusted under 35 U.S.C. 154(b) by 198 days.

(21) Appl. No.: 14/387,626

(22) PCT Filed: Mar. 16, 2013

(86) PCT No.: PCT/EP2013/000812
§ 371 (c)(1),
(2) Date: Sep. 24, 2014

(87) PCT Pub. No.: WO2013/143660
PCT Pub. Date: Oct. 3, 2013

(65) Prior Publication Data
US 2015/0090404 A1      Apr. 2, 2015

(30) Foreign Application Priority Data
Mar. 27, 2012 (DE) .................. 10 2012 006 037

(51) Int. Cl.
*B65G 47/00* (2006.01)
*B65B 17/02* (2006.01)
(Continued)

(52) U.S. Cl.
CPC .............. *B65B 17/02* (2013.01); *B65B 21/06* (2013.01); *B65B 27/04* (2013.01); *B65B 35/36* (2013.01);
(Continued)

(58) Field of Classification Search
CPC ....... B65B 17/02; B65B 17/025; B65B 21/06; B65B 21/20; B65B 21/183; B65B 21/18;
(Continued)

(56) References Cited

U.S. PATENT DOCUMENTS 3,753,509 A  * 8/1973 Kock ..................... B65B 21/18
                                                          198/404
3,864,890 A  * 2/1975 Ullman ................ B65B 21/183
                                                          53/247

(Continued)

FOREIGN PATENT DOCUMENTS

DE          2331193         1/1975
DE          3538119 A1  *   4/1987 ............. B65B 17/02
(Continued)

OTHER PUBLICATIONS

Machine translation of DE 3538119 date unknown.*
Definition of "bundle" from dictionary.com 2016.*
Definition of "accompany" from dictionary.com 2016.*

*Primary Examiner* — John Goff
(74) *Attorney, Agent, or Firm* — Occhiuti & Rohlicek LLP

(57) ABSTRACT

An apparatus for producing bundles of containers received from a wide container stream that is converted into plural single-track container streams. The apparatus has a dividing-off and/or compactor unit that divides off and compacts a predetermined number of containers to form a partial bundle to be combined with other partial bundles to form a full bundle. The apparatus also includes application elements that apply adhesive to a container, a linear transporter having a controllable drive, a guide element, a transport element that moves linearly along the guide element, and as many head guides as there are containers in a bundle. The head guides move and/or rotate relative to the transport element.

18 Claims, 3 Drawing Sheets

(51) Int. Cl.
*B65B 27/04* (2006.01)
*B65G 47/08* (2006.01)
*B65B 21/06* (2006.01)
*B65B 35/36* (2006.01)
*B65B 35/58* (2006.01)

(52) U.S. Cl.
CPC .............. *B65B 35/58* (2013.01); *B65G 47/08* (2013.01); *Y10T 156/1744* (2015.01)

(58) Field of Classification Search
CPC ......... B65B 35/14; B65B 35/16; B65B 35/36; B65G 47/08; B65G 47/088
USPC ...... 53/48.1, 543, 247, 531, 443; 198/419.3, 198/426
See application file for complete search history.

(56) References Cited

U.S. PATENT DOCUMENTS

| | | | | |
|---|---|---|---|---|
| 4,078,357 A | * | 3/1978 | Ida | B65B 17/02 156/561 |
| 4,251,979 A | * | 2/1981 | Horigome | B65B 21/04 53/247 |
| 5,271,709 A | * | 12/1993 | VanderMeer | B65G 47/088 198/419.1 |
| 5,447,012 A | * | 9/1995 | Kovacs | B65B 9/073 53/370.6 |
| 5,797,249 A | | 8/1998 | Hartness | |
| 6,328,153 B1 | * | 12/2001 | Manghi | B65G 47/086 198/468.11 |
| 7,726,464 B2 | | 6/2010 | Cerf | |
| 2010/0308043 A1 | * | 12/2010 | Wimmer | B65B 17/02 220/23.4 |

FOREIGN PATENT DOCUMENTS

| | | |
|---|---|---|
| DE | 3902667 | 8/1990 |
| DE | 4126212 | 2/1993 |
| DE | 10 2006 037105 | 2/2008 |
| DE | 10 2009 025824 | 11/2010 |
| DE | 10 2009 025912 | 12/2010 |
| DE | 10 2009 044271 | 4/2011 |
| EP | 1584559 | 10/2005 |
| EP | 2096039 | 9/2009 |
| EP | 2258625 | 12/2010 |
| NL | 9401201 A * | 10/1995 ............. B65B 21/18 |

* cited by examiner

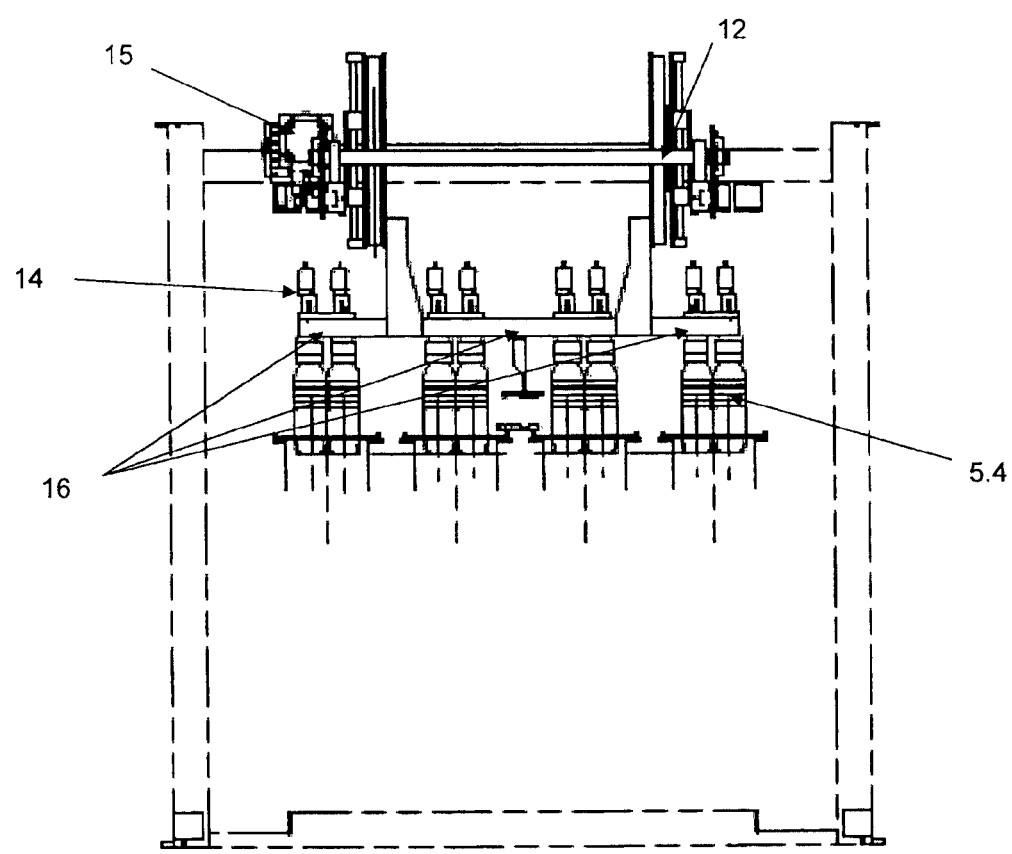

APPARATUS FOR FORMING PACKAGING UNITS

RELATED APPLICATIONS

This application is the national stage under 35 USC 371 of PCT/EP2013/00012, filed on Mar. 16, 2013, which claims the benefit of the priority date of DE 102012006037.8, filed on Mar. 27, 2012, the contents of which are herein incorporated by reference.

FIELD OF INVENTION

The invention relates to forming bundles of packages, and in particular, to producing bundles of containers received from a wide container stream that is converted into plural single-track container streams.

BACKGROUND

It is known to make bundles from containers that are standing on a transporter and being fed in a wide with their container axes oriented vertically or substantially vertically. The containers are oriented at a random angle so that any marks of other container features are oriented randomly. A lane division converts this wide container stream into single-track container streams. In further steps, the containers forming the subsequent bundle or the container groups thereof are divided off from the single-track container streams. The required number of containers is combined to form a compacted container group in which the containers bear against one another by a plurality of circumferential surfaces, or contact surfaces. The containers of each container group are connected to form the compact and stable bundle.

It is known to wrap such a bundle of containers with shrink film to produce stable and transportable storage and transport units or bundles. However, the energy cost associated with applying heat or energy to shrink the film gives rise to not inconsiderable costs.

It is also known to produce to form a loop around such bundles using a strap, thus binding them to one another to stabilize the bundle. The straps can in some cases be glued to the containers. However, one disadvantage of straps is that, when a container is first removed from such a bundle, the straps no longer securely hold the containers remaining in the bundle. This is true not only when the straps are cut, but even when it is possible to remove a container from the bundle without cutting through the straps.

When transporting bundles on a belt-type conveyor means, there is always the risk that cylindrical or largely cylindrical articles, such as cans, bottles or containers, will nest as a result of vibration, knocks, etc. Nesting results in a container sliding into the gap in the neighboring row, thus forming what amounts to an interstitial crystal defect. In order to prevent nesting, in the case of known bundles, a very high tension must be applied to the straps.

It is also known to assemble packs of bottles using a rotary star-wheel on both sides of a path to press bottle necks into clamps on flat carriers. In this method, a strap or casing, such as a film, encompasses the resulting pack of bottles.

It is also known to apply adhesive in narrow areas or rows to containers, wherein respectively adjacent bottles, which are not provided with adhesive, are intended to allow a gripping of the pack for carrying purposes. The containers stick to one another at the adhesive sites. EP 2 096 039 A1 likewise discloses providing containers with an adhesive, but a shrink-wrap film is additionally also arranged around the pack of bottles.

SUMMARY

The object of the invention is to provide an apparatus for producing bundles of containers that avoids the use of an encompassing film and/or straps, but that nevertheless avoids to a great extent having articles adopt a nesting position during transport such that, even after removing one or more articles from a bundle, the integrity of the bundle is maintained or can be re-established.

In order to achieve this object, an apparatus for producing bundles includes a linear transporter that has at least one transport element that has a controllable drive and that can be moved back and forth linearly in an alternating manner along a guide element. The transport element has a number of head guides corresponding to the number of containers of the subsequent bundle. The head guides are axially movable and/or rotatable relative to the transport element.

As used herein, "containers" includes bottles, cans, tubes or pouches, in each case made of metal, glass and/or plastic, including PET bottles, and other packaging means, particularly those suitable for being filled with liquid or viscous products, and also containers that have already been combined into groups, or multipacks. Such containers, for example PET bottles, have a contact area that is spherically curved so that the containers can roll against one another about a circumferential path, or "rolling ring". In the case of glass bottles, once the bottle has been used multiple times this rolling ring is made manifest by a wear ring that usually has a lighter color. In the case of PET bottles, such "rolling rings" may be arranged not only in the top area but also in the bottom area. The containers of the bundle are arranged in a non-nesting position.

As used herein, "adhesives" includes all materials or compounds that can be used to establish an adhesive bond between containers, particularly compounds or materials that, when applied in the liquid or viscous state, form a self-adhesive application and/or bring about an adhesive bond under the application of pressure, application of energy, and/or after curing or crosslinking, including by application of energy. The term "adhesives" also includes multilayer materials, for example those consisting of at least one carrier material that is coated with a material that can be used to establish an adhesive bond between containers, that is to say having an adhesive action on at least two sides. Such adhesives can be referred to as pads.

As used herein, an "adhering" container has adhesive or is provided with an application of adhesive. The adhesive is preferably selected such that the containers can be detached from the bundle and separated from one another manually and in a non-destructive manner.

It is conceivable for liquid adhesive to be applied by application elements. It is also possible for a UV-curable adhesive of low viscosity to be applied. Hot glue can also be used. However, hot glue cools very quickly. Thus, its adhesive properties may end before the containers of the bundle are sufficiently glued to one another. A UV-curable adhesive is also advantageous because its desired properties are particularly easy to set.

It is advisable for a suitable stationary curing station or a curing section to be provided downstream of the application elements or along the linear transporter either above or optionally also below the linear transporter. A curing station may be, for example, a tunnel with UV lighting.

It is also advantageous for the transport element to be designed as a carriage, or a carrying frame. The transport element or the carriage has a controllable drive that can be actuated by a suitable control unit. This is advantageous in the context of the invention since the transport element can thus have a transport speed that is adapted to the respective requirement.

Because of the controllable drive, the transport element contacts the guide element. The guide element can also be a guide rail along which the transport element is moved by the controllable drive. In the context of the invention, it is advantageous for the transport element or the carriage to be held on a guide element on its respective longitudinal side arranged longitudinally relative to the transport direction. The transverse sides arranged, which are perpendicular to the longitudinal sides, extend transversely to the transport direction between the guide elements so that the carrying frame or the carriage is guided in a secure and stable manner.

The controllable drive can, in this case, be arranged only on one of the two longitudinal sides. A suitable roller element, driven by the drive located opposite, can be arranged on the other longitudinal side. It is also possible for controllable drives to be arranged on both longitudinal sides. These controllable drives can be synchronized. The controllable drive can be configured, for example, as a servo-motor.

In some embodiments, the transport element is a double head carriage having separately actuatable head guides. Such an embodiment enables increased performance compared to a single carriage because more bundles can be processed. Another advantage is that, since more bundles must be processed on the outward leg, more time is available for the transport element to complete its return leg. Moreover, the drive is controllable so that the transport element can be much quicker on the return leg than on the outward leg.

Using the head guides, the containers are transported while held on the transport element from the entry side, past the application elements, to the exit side. At the entry side, an entry conveyor receives the containers. At the exit side, the containers, which have been provided with adhesive, are handed over to an exit conveyor. The entry and exit conveyors may each be embodied as belt-type conveyors, or conveyor belts.

It is advantageous that the transport element have a controllable drive that can be actuated separately by a control unit. The transport element can thus have different speeds along its transport path, and in particular, different speeds on an outward leg and along a "return leg" of the transport path.

As used herein, the outward leg is the leg during which the transport element transports the containers held thereon in the transport direction from the entry side towards the exit side. The return leg is the leg during which the transport element is transported empty, without any containers held thereon, along a direction opposite the transport direction from the exit side to the entry side.

The containers can be transported by the transport element along the outward leg in a suspended manner since the containers can be held on the head guides. The head guides can have packing or centering bells for holding the containers at the mouth ends thereof.

It is advantageous for the head guides to be movable relative to the transport element, or relative to the carrying frame or carriage. In this way, for example, a targeted orientation of the containers according to design features, existing labels or similar features can be carried out so that the containers within the subsequent bundle are oriented in the same direction relative to one another. To achieve this, the head guides need only be actuated in an appropriate manner.

Preferably, each head guide can be controlled separately, or independently of the others. A control unit, which can be a central control unit, generates suitable control signals for controlling movements of the head guides.

Some embodiments have only one suitable inspection device. This inspection device detects the actual position of the containers on the basis of the features to be examined, for example on the basis of the label position, carries out suitable comparisons with stored nominal positions, and then generates appropriate signals.

It is advantageous that the head guides be rotatable about their axis, movable axially, and/or able to transport the containers while they are suspended. Due to the available degrees of freedom, it is possible to superpose various required position changes so that each container can be oriented in a desired nominal position corresponding to the other containers. Transporting the container is while it is suspended eliminates frictional resistances acting on the container bottoms. However, it is also possible for a container to be held at a head guide and to stand on a conveyor belt.

In one preferred embodiment, application elements or application stations are arranged before the point at which containers are handed over to the exit conveyor, as seen in the transport direction. The application elements provide the containers with adhesive. As a result of the independent movement of containers relative to each other resulting from independent head guide movement, the head guides can generate a certain pressing force to promote an adhesive bond between the containers.

In one advantageous embodiment, application elements or application stations are provided one after the other as seen in the transport direction. Because a container held on a packing or centering bell can rotate, contact faces that are circumferentially offset from each other can be provided with adhesive. This promotes an adhesive bond since almost every container will then be able to enter into an adhesive bond with a directly adjacent container on at least two contact faces.

The bundle may be formed for example of six containers. In this case, as already indicated above, the head guides can exert a force transversely and longitudinally relative to the transport direction to press containers of a bundle are pressed against one another. This has a positive effect on the adhesive bond. To this end, the head guides could be arranged closer together in order to increase the acting pressure force.

It is advantageous that, as described above, in each case a plurality of subsequent bundles can be processed by one transport element. In one embodiment, eight bundles, each of which comprises six containers, are processed. Thus, on the entry side, eight separate input streams are accepted, while on the exit side, four separate output streams are discharged.

The exit conveyor can comprise belts. This allows a rotation of the bundle in any direction. In some embodiments, acceleration belts are also be provided.

In some embodiments, the entry conveyor has a conveyor for each container stream. In each case, two conveyors are arranged in pairs and run parallel to one another when the bundle has two adjacent containers as seen transversely relative to the transport direction.

If UV-curable adhesive is applied, a curing station or curing section may be provided. The curing station may be arranged above or below the transport surfaces. In some embodiments, the curing station includes a tunnel with UV lighting. Driver elements on the exit conveyor can also be provided to assist the transport of full bundles towards the exit side.

A bundle can be configured with multiple rows as seen in the transport direction. Some embodiments have two such rows and others have three rows. It is possible to arrange the application elements or application stations not only in a fixed position on the linear transporter but also in a movable manner so that the application elements can be carried along at least one sub-section with the respective container stream or with the transport element.

It is possible to provide the bundle with a carrying element, for example with a handle. To add the carrying element, suitable devices are arranged downstream of the exit side or at a suitable location on the linear transporter. The carrying element can be attached to the bundle by such an adhesive.

The invention thus provides an apparatus for producing a bundle that avoids the use an encompassing film and/or despite not using straps, but that nevertheless easily prevents the containers nesting during transport. In such a bundle, even after removing one or more containers from a bundle, the bundle continues to be held together by the remaining containers in the bundle or the bundle can easily be re-established. Avoiding use of a film or a strap avoids waste resulting from consumption of resources for producing the films or straps, which are usually made from plastic and thus yields more environmentally friendly packaging.

The containers of a bundle are directly adhesively bonded to one another during transport, throughout continuous operation of the apparatus for producing bundles, or the packaging machine. Moreover, a filmless bottle pack with a minimal application of adhesive can be achieved, with the amount being no more than enough to form a sufficient bond between the individual containers.

As a result of the controllable acceleration and velocity of the transport element, considerable throughout can be achieved.

In one aspect, the invention features an apparatus for producing bundles of containers received from a wide container stream that is converted into plural single-track container streams. Such an apparatus includes a dividing-off and/or compactor unit, application elements, a linear transporter having a transport element having a controllable drive, a guide element, and head guides, the cardinality of which equals that of the containers in a container bundle. The dividing-off and/or compactor unit divides off and/or compacts a predetermined number of containers to form a partial bundle to be combined with other partial bundles to form a full bundle. The application elements are configured such that at least one contact face of at least one container in a bundle of containers has an adhesive and/or an application of adhesive thereon. The transport element, which is a constituent of the linear transporter, moves back and forth linearly along the guide element. The head guides are either axially movable relative to the transport element, rotatable relative to the transport element, or both.

In some embodiments, the transport element includes a carriage. In these embodiments, the controllable drive and the carriage are coupled together.

In other embodiments, the transport element has a longitudinal side, and the transport element is guided at a longitudinal side on the guide element.

Other embodiments include a subsection along which the containers are transported by the transport element while suspended.

Yet other embodiments include a controllable conveyor belt. In such embodiments, the transport element is configured to guide containers at a top thereof, and the containers stand, on bottoms thereof, on the controllable conveyor belt.

Other embodiments include those in which the head guides can be actuated independently of each other, those in which the transport element is configured such that plural subsequent bundles are transportable by the transport element, and those further include a section along which the application elements accompany the containers.

In another aspect, the invention features an apparatus for producing bundles of containers received from a wide container stream that is converted into plural single-track container streams. The apparatus has a dividing-off an/or compactor unit that divides off and compacts a predetermined number of containers to form a partial bundle to be combined with other partial bundles to form a full bundle. The apparatus also includes application elements that apply adhesive to a container, a linear transporter having a controllable drive, a guide element, a transport element that moves linearly along the guide element, and as many head guides as there are containers in a bundle. The head guides move and/or rotate relative to the transport element.

Further developments, advantages and possible uses of the invention will become apparent from the following description of examples of embodiments and from the figures. All the features described and/or shown in the figures, per se or in any combination, form in principle the subject matter of the invention, regardless of the way in which they are combined or refer back to one another in the claims. The content of the claims also forms part of the description.

BRIEF DESCRIPTION OF THE DRAWINGS

The invention will be explained in more detail below with reference to the figures and on the basis of an example of embodiment. In the figures:

FIG. 3 shows the sub-section of FIG. 1 in a front view.

In the various figures, identical parts are always provided with the same references, and for this reason they will generally also be described only once.

DETAILED DESCRIPTION

Figure 1:
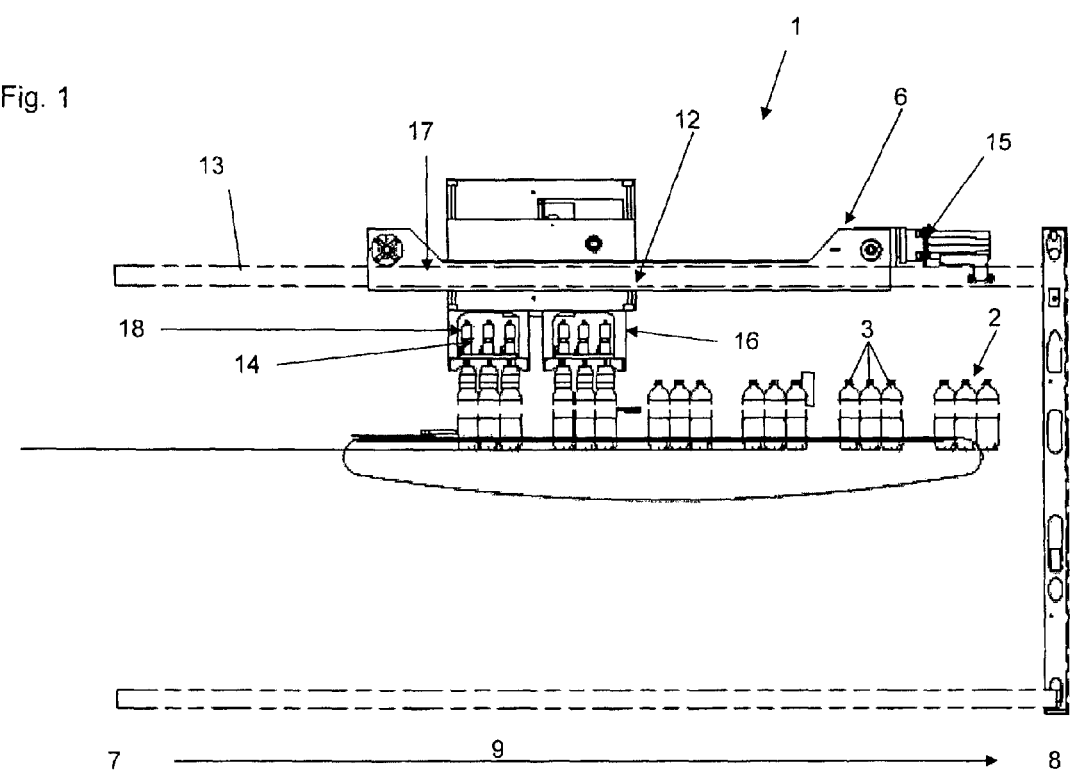
FIG. 1 shows a sub-section of an apparatus for producing a plurality of bundles comprising six articles or containers, in side view.
Figure 2:
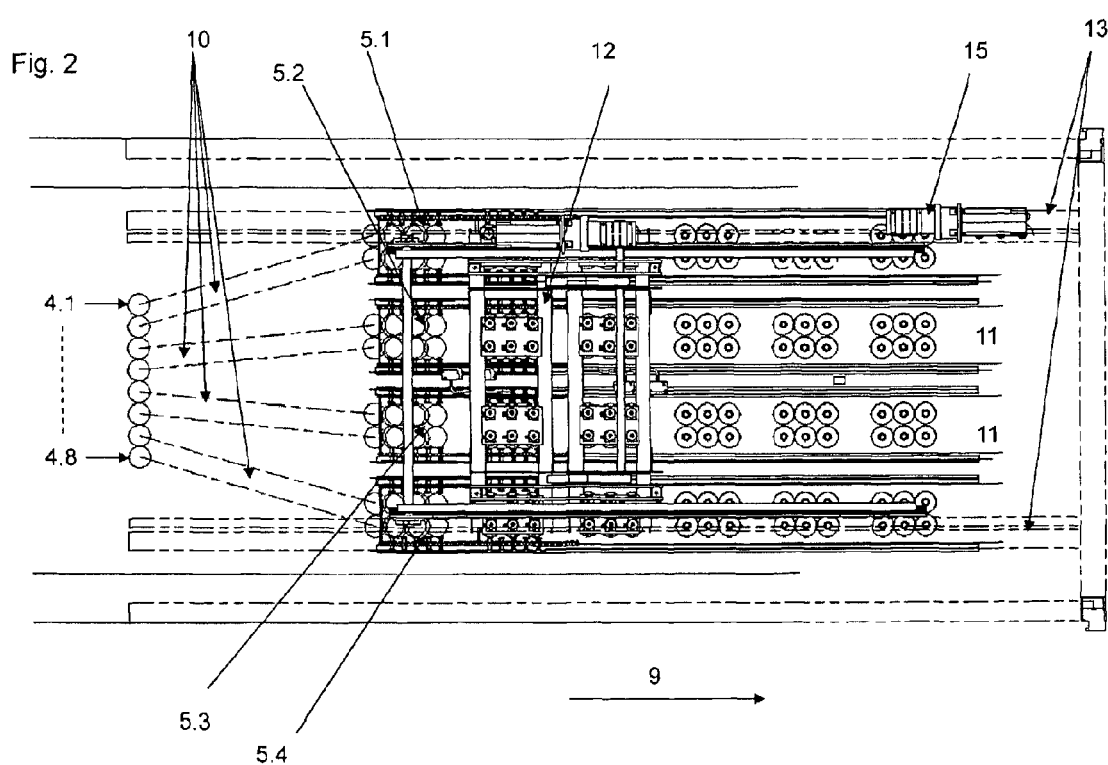
FIG. 2 shows the sub-section of FIG. 1 in a plan view.

FIG. 1 shows a sub-section of an apparatus 1 for producing bundles 2 of containers 3, or a packaging machine 1, wherein, in the run-up, containers 3 are converted from a wide container stream into a plurality of single-track container streams 4.1-4.8, shown in FIG. 2. Although FIG. 2 shows eight container streams, the number of container streams can be varied.

Within the container streams, the containers 3 have a random orientation with regard to their container features and/or equipment features. Compacted or formed container groups 5.1 to 5.4 or partial bundles 5.1 to 5.4, shown in FIG. 2, are formed by dividing off and bringing together a predetermined number of containers 3, for example six containers 3, and thereafter combining them to form a bundle 2. At least one of the containers 3 of the bundle 2, preferably each container 3, has an adhesive and/or an application of adhesive on at least on one contact face thereof.

FIG. 1 shows a linear transporter 6 that transports the containers 3 from an entry side 7 towards an exit side 8 along a transport direction 9. At the entry side, an entry conveyor 10, also referred to as a distribution section, is provided for each container stream 4.1 to 4.8. At the exit side, exit conveyors 11 are provided. Railings are arranged between the exit conveyors 11. Driver elements can be arranged on the railings. These drive elements move along with the exit conveyors.

In the exemplary embodiment, the linear transporter 6 has only a single transport element 12. The transport element 12, which can be designed as a carriage or as a carrying frame, has a controllable drive 15 and can be moved back and forth linearly along a guide element, which in the illustrated embodiment is implemented as a guide rail 13. The controllable drive 15 can be a servo-motor The transport element 12 has a number of head guides 14, with the number corresponding to the number of containers 3 of the subsequent bundle 2. These head guides are axially movable and/or rotatable relative to the transport element 12.

Because of the controllable drive 15, the transport element 12 contacts the guide rail 13 along which the controllable drive 15 moves the transport element 12. As can be seen in FIG. 2, each side of the linear transporter 6 has a guide rail 13 between which the transport element 12 is mounted in a movable manner.

Because of the head guides 14, the containers 3 are transported while held on the transport element 12 from the entry side, past application elements for applying adhesive, to the exit side. At the entry side, the containers 3 enter via the entry conveyor 10. At the exit side, the containers 3 are handed over to the exit conveyor 11. The entry and exit conveyors 10, 11 can be embodied as conveyor belts.

The transport element 12 or the carriage is held on a guide rail 13 on its longitudinal side 17, which is arranged longitudinally relative to the transport direction 9.

The controllable drive 15 can be actuated separately a control unit. The transport element 12 can thus have different speeds along its transport path. In particular, the transport element 12 can move with a higher speed along a return leg than along an outward leg of the transport path. In the particular embodiment shown in FIGS. 2 and 3, the transport element 12 has six bundle holders 16 on which the head guides 14 are arranged so that eight subsequent bundles 2 can be transported by one transport element 12. Because of the selected view, two bundle holders 16 that follow one another in the transport direction can be seen in FIG. 2. It is possible to see three bundle holders 16 transverse to the transport direction in FIG. 3. The middle bundle holder 16 in FIG. 3 accommodates two subsequent bundles 2.

The longitudinal and transverse sides of the carriage 12 are oriented horizontally. Rollers for rolling against the guide element are arranged at least at the corners thereof. The bundle holders 16 are spaced apart from the carriage 12 via webs that run substantially in the vertical direction.

Along the outward leg, it is possible for the containers 3 to be transported while suspended since the containers are held on the head guides 14.

The head guides 14 may have packing or centering bells 18 for holding the containers 3 at mouth ends thereof. In some embodiments, the head guides 14 are movable relative to the transport element 12, or relative to the carrying frame or carriage. This movability enables targeted orientation of the containers 3 based on their design features, existing labels or similar features so that all containers 3 within a particular bundle 2 are oriented in the same direction relative to each other. To be able to orient the containers 3 correctly, the head guides 14 need only to be actuated in an appropriate manner. It is preferable that each head guide 14 be controlled separately, or independently of the others. Control signals or control movements can be induced by a suitable control unit or by a central control unit.

In some embodiments, there is but one suitable inspection device provided to detect actual position of containers, to carry out suitable comparisons with stored nominal positions, and to then generate appropriate signals. It is advantageous for the head guides 14 to be rotatable about their vertical axis, and to also be movable axially along transverse and longitudinal axes, and to enable containers 3 to be transported while suspended.

In one preferred embodiment, the adhesive application elements are arranged before the containers 3 are handed over onto or to the exit conveyor 11 and after the optional orientation of the containers 3. The adhesive application elements provide the containers with adhesive. The ability of the head guides 14 to move the containers 3 relative to one another both pivotally and axially enables them to exert a certain pressing force, which promotes an adhesive bond between the containers 3.

A plurality of application elements or application stations can also be provided one after the other as seen in the transport direction 9.

Having described the invention, and a preferred embodiment thereof, what we claim as new, and secured by Letters Patent is:

1. An apparatus for producing bundles of containers received from a wide container stream that is converted into plural single-track container streams, said apparatus comprising a dividing-off and/or compactor unit, application elements, a linear transporter, a transport element, a controllable drive, a guide element, and head guides, wherein said dividing-off and/or compactor unit divides off and/or compacts a predetermined number of containers to form a partial bundle to be combined with other partial bundles to form a full bundle, wherein said application elements are configured such that at least one contact face of at least one container in a bundle of containers has an adhesive and/or an application of adhesive thereon, wherein said transport element is a constituent of said linear transporter, wherein said controllable drive is a constituent of said transport element, wherein said transport element is movable back and forth linearly along said guide element, wherein said head guides are attached to said transport element, wherein a cardinality of said head guides equals a cardinality of containers in a bundle of containers, wherein said head guides are at least one of axially movable relative to said transport element and rotatable relative to said transport element, said apparatus further comprising a section of said guide element along which said application elements are carried along with said containers.

2. The apparatus of claim 1, further comprising a first leg along which said transport element transports suspended containers and a second leg along which said transport element transports no containers.

3. The apparatus of claim 1, wherein said transport element is movable back and forth linearly along said guide element at a speed that can be varied by said controllable drive.

4. An apparatus for producing bundles of containers received from a wide container stream that is converted into plural single-track container streams, said apparatus comprising a dividing-off and/or compactor unit, application elements, a linear transporter, a transport element, a controllable drive, a guide element, and head guides, wherein said dividing-off and/or compactor unit divides off and/or compacts a predetermined number of containers to form a partial bundle to be combined with other partial bundles to form a full bundle, wherein said application elements are configured such that at least one contact face of at least one container in a bundle of containers has an adhesive and/or an application of adhesive thereon, wherein said transport element is a constituent of said linear transporter, wherein said controllable drive is a constituent of said transport element, wherein said transport element is movable back and forth linearly along said guide element, wherein said head guides are attached to said transport element, wherein a cardinality of said head guides equals a cardinality of containers in a bundle of containers and rotatable relative to said transport element, and wherein said head guides are rotatable relative to said transport element.

5. The apparatus of claim 4, wherein said head guides are axially movable relative to said transport element.

6. The apparatus of claim 4, wherein said transport element is movable back and forth linearly along said guide element at a speed that can be varied by said controllable drive.

7. The apparatus of claim 4, wherein said transport element comprises a carriage, and wherein said controllable drive is coupled to said carriage.

8. The apparatus of claim 4, wherein said transport element comprises a longitudinal side, and wherein said transport element is guided at said longitudinal side on said guide element.

9. The apparatus of claim 4, further comprising a first leg along which said transport element transports suspended containers and a second leg along which said transport element transports no containers.

10. The apparatus of claim 4, further comprising a controllable conveyor belt, wherein said transport element is configured to guide containers at a top thereof, wherein said containers stand, on bottoms thereof, on said controllable conveyor belt.

11. The apparatus of claim 4, wherein said head guides are actuatable independently of each other.

12. The apparatus of claim 4, wherein said transport element is configured such that plural subsequent bundles are transportable by said transport element.

13. The apparatus of claim 4, further comprising a section along which said application elements accompany said containers.

14. The apparatus of claim 4, wherein said transport element is configured to move at a first speed along a return leg and at a second speed along an outward leg.

15. The apparatus of claim 14, wherein said first speed exceeds said second speed.

16. An apparatus for producing bundles of containers received from a wide container stream that is converted into plural single-track container streams, said apparatus comprising a dividing-off and/or compactor unit, application elements, a linear transporter, a transport element, a controllable drive, a guide element, and head guides, wherein said dividing-off and/or compactor unit divides off and/or compacts a predetermined number of containers to form a partial bundle to be combined with other partial bundles to form a full bundle, wherein said application elements are configured such that at least one contact face of at least one container in a bundle of containers has an adhesive and/or an application of adhesive thereon, wherein said transport element is a constituent of said linear transporter, wherein said controllable drive is a constituent of said transport element, wherein said transport element is movable back and forth linearly along said guide element, wherein said head guides are attached to said transport element, wherein a cardinality of said head guides equals a cardinality of containers in a bundle of containers, wherein said head guides are at least one of axially movable relative to said transport element and rotatable relative to said transport element, said apparatus further comprising a section of said guide element along which said application elements are carried along with said transport element.

17. The apparatus of claim 16, wherein said head guides are actuatable independently of each other.

18. The apparatus of claim 16, wherein said transport element comprises a longitudinal side, and wherein said transport element is guided at said longitudinal side on said guide element.

* * * * *